United States Patent
Kunde

[11] Patent Number: 5,844,101
[45] Date of Patent: Dec. 1, 1998

[54] LIGHT-FAST DISAZO DYESTUFFS

[75] Inventor: Klaus Kunde, Neunkirchen, Germany

[73] Assignee: Bayer Aktiengesellschaft, Leverkusen, Germany

[21] Appl. No.: 933,193

[22] Filed: Sep. 17, 1997

[30] Foreign Application Priority Data

Sep. 23, 1996 [DE] Germany .................. 196 38 889.9

[51] Int. Cl.$^6$ .............. C09B 31/08; D06P 3/58; D21H 21/28
[52] U.S. Cl. .............. 534/797; 534/819; 534/598; 534/599; 534/591
[58] Field of Search .................. 534/797, 819

[56] References Cited

U.S. PATENT DOCUMENTS

| | | | |
|---|---|---|---|
| 5,225,545 | 7/1993 | Lauk | 534/797 X |
| 5,288,294 | 2/1994 | Käser | 8/919 X |
| 5,487,761 | 1/1996 | Kaser | 8/919 X |
| 5,512,663 | 4/1996 | Kunde | 534/633 |
| 5,542,956 | 8/1996 | McMullan et al. | 8/641 |
| 5,559,217 | 9/1996 | Käser | 534/828 |

*Primary Examiner*—Fiona T. Powers
*Attorney, Agent, or Firm*—Sprung Kramer Schaefer & Briscoe

[57] ABSTRACT

The novel dyestuffs of the formula (I)

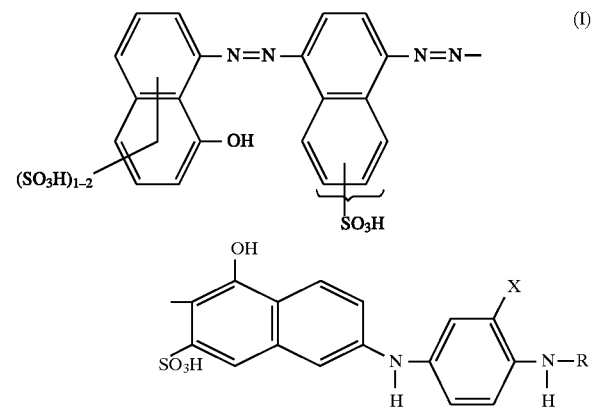

in which the substituents R and X have the meaning given in the description, are outstandingly suitable for dyeing cellulosic materials in blue color shades which are particularly fast to light.

10 Claims, No Drawings

LIGHT-FAST DISAZO DYESTUFFS

The present invention relates to novel disazo dyestuffs, processes for their preparation and their use for dyeing cellulosic materials.

The present invention relates to novel dyestuffs of the formula (I)

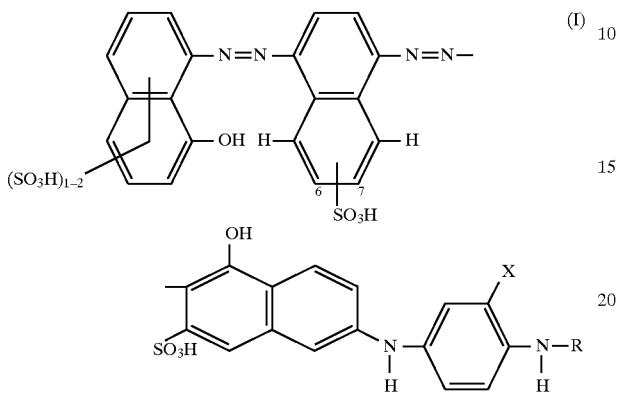

in which the sulfo group is bonded in the 6- or 7-position,

R represents benzoyl or naphthoyl, in each case optionally substituted once to three times in an identical or different manner by $C_1$–$C_4$-alkyl, $C_1$–$C_4$-alkoxy, F, Cl, Br, COOH, $SO_3H$ or $NO_2$, or represents 1,3,5-triazinyl which is substituted in positions 4 and 6 in an identical or different manner by OH, $NH_2$, $NHC_2H_4OH$, $N(CH_3)C_2H_4OH$, $N(C_2H_4OH)_2$

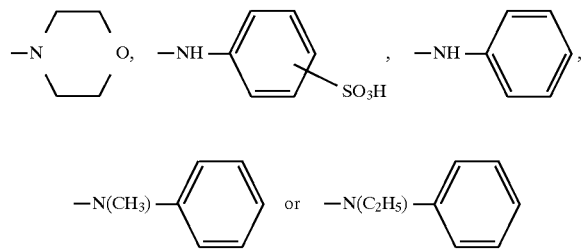

and

X represents $SO_3H$ or COOH.

Preferred dyestuffs are those of the formula (II)

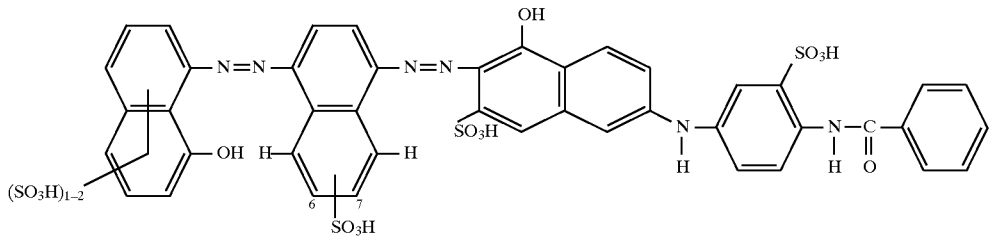

in which the sulfo group is bonded in the 6- or 7-position.

Particularly preferred dyestuffs are those of the formula (III)

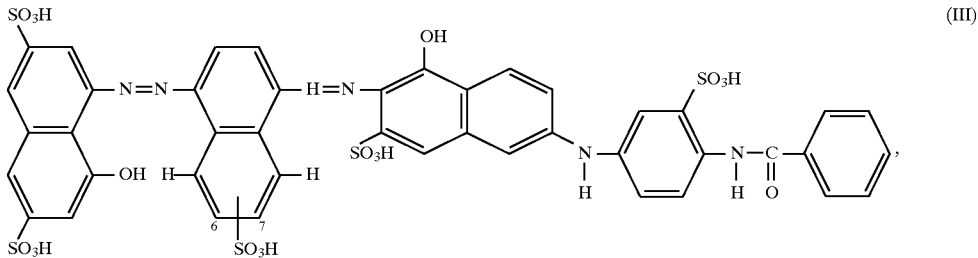

in which the sulfo group is bonded in the 6- or 7-position.

The dyestuffs of the formula (I) according to the invention can be prepared by coupling compounds of the formula (IV)

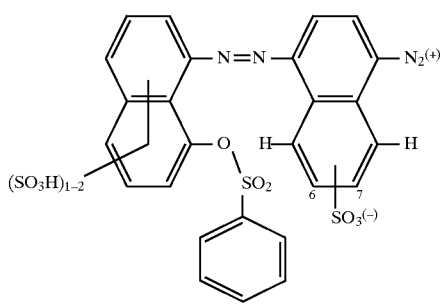

in which the sulfato group is bonded in the 6- or 7-position, with compounds of the formula (V)

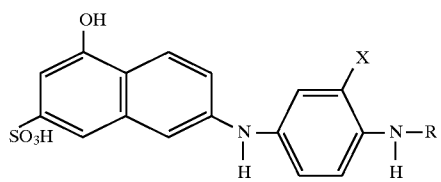

in which

R and X have the meaning given above under formula (I), and then splitting off the benzenesulfonic acid radical selectively in a known manner, or by subjecting compounds of the formula (VI)

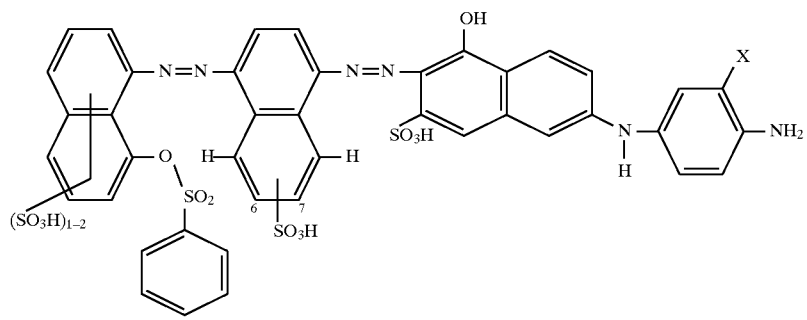

in which the sulfo group is bonded in the 6- or 7-position and

X has the meaning given above under formula (I), either a) to a condensation reaction with compounds of the formula R'-Cl,
in which R' represents a benzoyl or naphthoyl radical which is optionally substituted once to three times in an identical or different manner by $C_1$–$C_4$-alkyl, $C_1$–$C_4$-alkoxy, F, Cl, Br, COOH, $SO_3H$ or $NO_2$, or b) to prepare the 1,3,5-triazine derivatives substituted in the 4- and 6-position, to a reaction first with cyanuric chloride and then either stepwise with aqueous alkali, preferably sodium hydroxide solution, or an amine of the formula

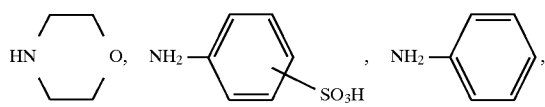

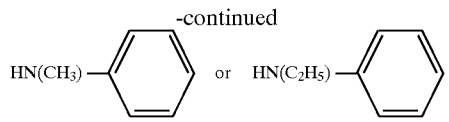

and then splitting off the benzenesulfonic acid radical selectively.

The compounds of the formula (IV) and (V) are known or can be prepared analogously to known compounds.

Dyestuffs of the formula (I) in which R represents hydrogen are known from EP-A 0 534 903. The dyestuffs according to the invention differ from these known dyestuffs by better exhaust properties, i.e. significantly less dyestuff remains in the waste water from the dyeing. Dyestuffs of the formula (I) in which X denotes hydrogen are described in EP-A 0 514 330, and compared with these known dyestuffs, the dyestuffs according to the invention have significantly better solubility in water and a significantly lower difference in the color shades on paper sized with rosin size compared with unsized paper.

The coupling of the diazonium compounds of the formula (IV) with the compounds of the formula (V) is carried out in an aqueous or aqueous-organic medium, preferably in water, in solution or suspension at 0° to 40° C., preferably at 5° to 20° C., at pH values between 7 and 10, preferably between 8.5 and 9.5.

The selective splitting off of the benzenesulfonic acid radical is carried out at temperatures between 60° and 105° C., preferably between 70° and 90° C., at pH values between 10 and 11.5, preferably between 10.2 and 11.0.

The condensation of the compounds of the formula (VI) with compounds of the formula R'-Cl, in which R' represents an optionally substituted benzoyl or naphthoyl radical, is carried out in aqueous solution at pH values between 3 and 10, preferably between 5 and 8, at temperatures between 8° and 50° C., preferably between 10° and 40° C., and the process is known per se.

The condensation of the compounds of the formula (VI) with cyanuric chloride is carried out in an aqueous medium at temperatures between 0° and 20° C. at pH values of between 4 and 6, the replacement of the second Cl atom by one of the abovementioned amines is carried out at temperatures between 20° and 60° C. at pH values between 5 and 9, and the replacement of the third Cl atom by one of the abovementioned amines or of the second and third Cl atom by OH is carried out at temperatures between 50° and 160° C. at pH values between 5 and 10; the process is known per se.

The reaction of the compounds of the formula (VII)

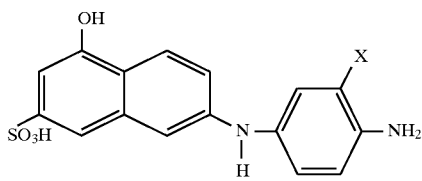

(VII)

in which

X has the abovementioned meaning, to give the compounds of the formula (V) is carried out analogously.

The dyestuffs according to the invention can be used for dyeing cellulosic materials, in particular paper, in blue color shades which are very fast to light.

The dyestuffs can be used by all the processes customary for substantive dyestuffs in the paper and textile industry, in particular in the pulp and in the surface dyeing of paper for sized and unsized grades, starting from bleached or unbleached cellulose of various origins, such as softwood or hardwood sulfite and/or sulfate cellulose. They can also be used in the dyeing of yarn or piece-goods of cotton, viscose and linen by the exhaust process from a long liquor or in continuous processes.

For dyeing paper in the pulp, the dyestuffs can be added to the paper pulp before sheet formation, either to the thick matter after breaking up the cellulose or to the thin matter before feeding to the papermaking machine. In the preparation of paper sized in the pulp, they are preferably added to the thin matter before addition of the sizing agent.

In the case of surface treatment, the dyestuff is applied after sheet formation. This is preferably carried out in the size press, by dissolving the dyestuff in a concentrated starch solution and applying it in this form to the paper.

The dyestuffs of the formula (I) can be employed as solid dyestuff preparations, preferably as powders or granules, which optionally comprise customary additives, such as, for example, ionic or nonionic formulating agents and/or dust removal agents.

The use of liquid preparations, in particular the use of concentrated aqueous solutions, which are preferably free from organic solubilizing agents and comprise at least one dyestuff of the general formula (I), is preferred for the process according to the invention. The liquid dyestuff preparations in general comprise 10 to 40% by weight, preferably 20 to 40% by weight, of at least one dyestuff of the formula (I), based on the finished preparation.

EXAMPLE 1

70.4 g of the diazonium compound of the formula (VIII)

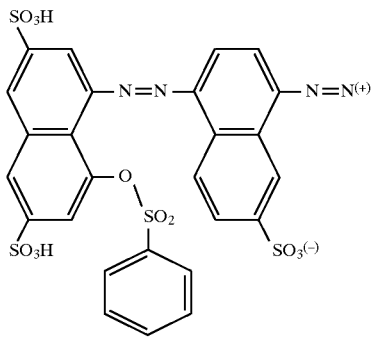

(VIII)

are dissolved in 500 ml of water and the solution is added dropwise to a solution of 51.4 g of the compound of the formula (IX)

(IX)

in 500 ml of water at a temperature of 5° to 10° and a pH of 8, the pH being kept constant with sodium carbonate solution. When the coupling has ended, the solution is heated to 80° C. and sodium hydroxide solution is added until the pH remains constant at 10.8. When the ester hydrolysis has ended, the pH of the solution is brought to 7 with hydrochloric acid. The dyestuff is precipitated out by addition of NaCl, isolated and dried ($\lambda_{max}$=607 nm).

EXAMPLE 2

If the compound of the formula (X)

(X)

is used instead of the compound of the formula (VIII), the isomeric dyestuff is obtained ($\lambda_{max}$=599 nm).

EXAMPLE 3

40.0 g of 4-hydroxy-7-(4'-amino-3'-sulfophenylamino)-naphthalene-2-sulfonic acid are dissolved in 500 ml of water with sodium carbonate solution at 25° C. and a pH of 6 and 17.5 g of benzoyl chloride are then added dropwise, the pH being kept constant with sodium carbonate solution. The condensation product corresponds to the following formula:

I claim:

1. A dyestuff of the formula (I)

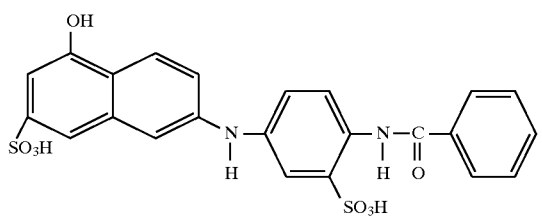

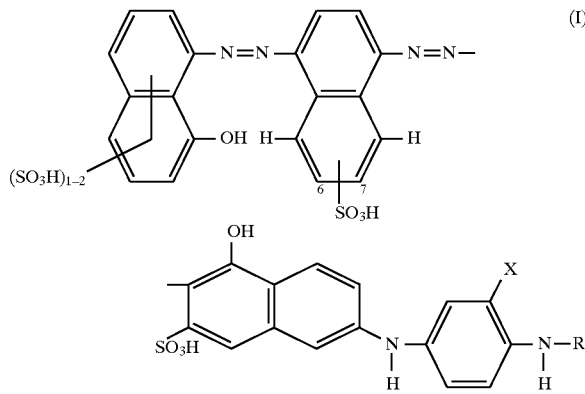

in which the sulfo group is bonded in the 6- or 7-position,

R represents benzoyl or naphthoyl, in each case optionally substituted once to three times in an identical or different manner by $C_1$–$C_4$-alkyl, $C_1$–$C_4$-alkoxy, F, Cl, Br, COOH, $SO_3H$ or $NO_2$, or represents 1,3,5-triazinyl which is substituted in positions 4 and 6 in an identical or different manner by OH, $NH_2$, $NHC_2H_4OH$, $N(CH_3)C_2H_4OH$, $N(C_2H_4OH)_2$

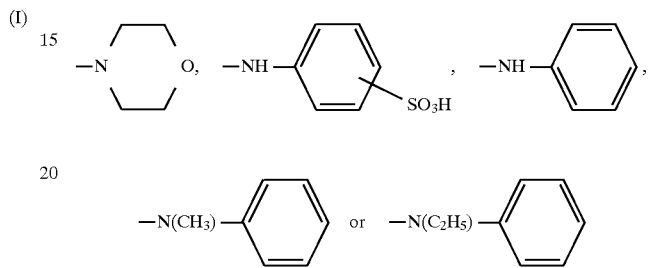

and

X represents $SO_3H$ or COOH.

2. A dyestuff as claimed in claim 1, of the formula

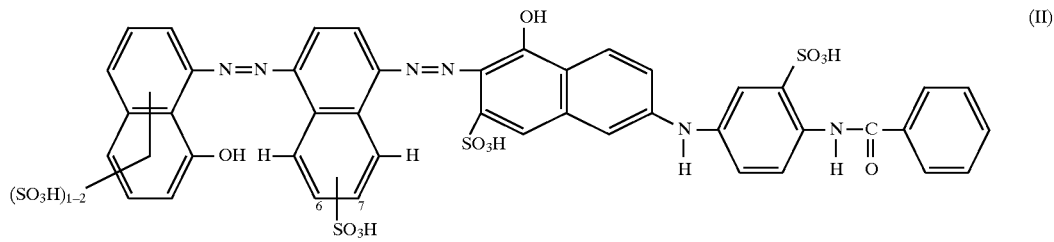

in which the sulfo group is bonded in the 6- or 7-position.

3. A dyestuff as claimed in claim 1, of the formula

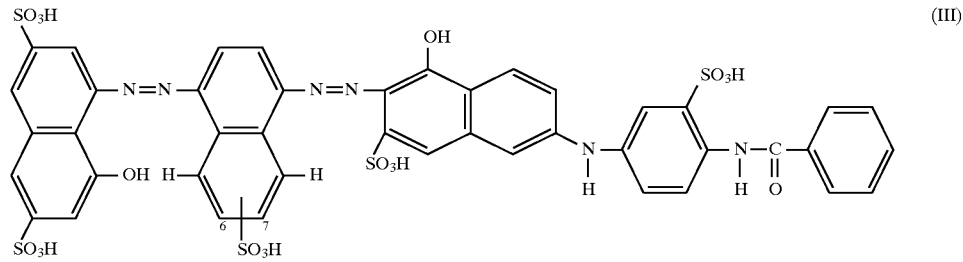

in which the sulfo group is bonded in the 6- or 7-position.

4. A process for the preparation of a dyestuff as claimed in claim 1, which comprises coupling a compound of the formula (IV)

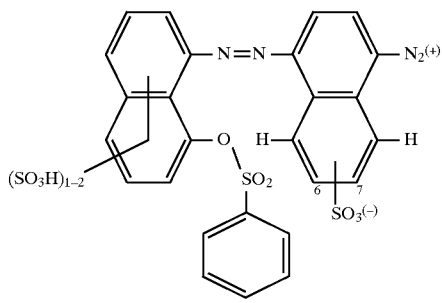

in which the SO$_3$— group is bonded in the 6- or 7-position, with a compound of the formula (V)

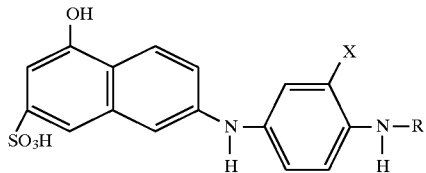

in which
R and X have the meaning given in claim 1,
and then splitting off the benzenesulfonic acid radical selectively in a known manner.

5. A process for the preparation of a dyestuff as claimed in claim 1, which comprises subjecting a compound of the formula (VI)

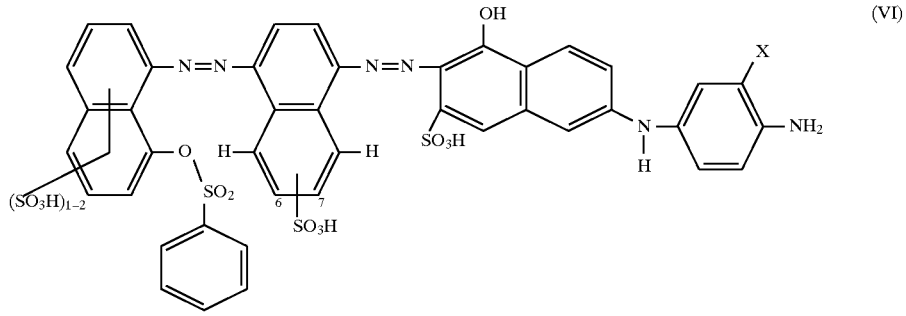

in which the sulfo group is bonded in the 6- or 7-position and X has the meaning given in claim 1, either a) to a condensation reaction with a compound of the formula R'-Cl, in which R' represents a benzoyl or naphthoyl radical which is optionally substituted once to three times in an identical or different manner by C$_1$–C$_4$-alkyl, C$_1$–C$_4$-alkoxy, F, Cl, Br, COOH, SO$_3$H or NO$_2$, or b) to prepare a 1,3,5-triazine derivative substituted in the 4- and 6-position, to a reaction first with cyanuric chloride and then either stepwise with aqueous alkali or an amine of the formula

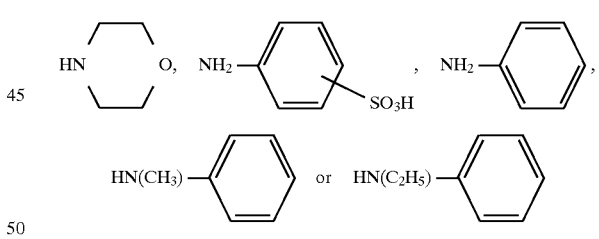

and then splitting off the benzenesulfonic acid radical selectively.

6. A process according to claim 5, wherein the aqueous alkali is sodium hydroxide.

7. A process for dyeing cellulosic materials comprising applying thereto a dyestuff as claimed in claim 1.

8. A process for dyeing paper comprising applying thereto a dyestuff as claimed in claim 1.

9. Cellulosic materials dyed with a dyestuff as claimed in claim 1.

10. Paper dyed with a dyestuff as claimed in claim 1.

* * * * *

UNITED STATES PATENT AND TRADEMARK OFFICE
CERTIFICATE OF CORRECTION

PATENT NO. : 5,844,101
DATED : December 1, 1998
INVENTOR(S) : Klaus Kunde

It is certified that error appears in the above-identified patent and that said Letters Patent are hereby corrected as shown below:

Col. 10, Line 40          After "alkali" insert --solution--

Col. 10, Line 42          Insert -- $NH_3$, $NH_2C_2H_4OH$, $NH(CH_3)C_2H_4OH$, $NH(C_2H_4OH)_2$ --

Signed and Sealed this

Eighth Day of February, 2000

Attest:

Q. TODD DICKINSON

Attesting Officer

Commissioner of Patents and Trademarks